United States Patent [19]

Koonts

[11] 4,121,958
[45] Oct. 24, 1978

[54] INSULATION BOARD

[75] Inventor: Lamonte R. Koonts, Newton, N.J.

[73] Assignee: United States Mineral Products Company, Stanhope, N.J.

[21] Appl. No.: 835,235

[22] Filed: Sep. 21, 1977

Related U.S. Application Data

[63] Continuation of Ser. No. 554,814, Mar. 3, 1975, abandoned, which is a continuation-in-part of Ser. No. 518,111, Oct. 25, 1974, abandoned.

[51] Int. Cl.$^2$ .................... B32B 5/18; B05D 3/02; B29H 7/20
[52] U.S. Cl. .................... 156/79; 428/314; 264/45.1
[58] Field of Search ............... 428/310, 319, 315, 320, 428/321, 322, 525, 527; 156/79; 264/45.1, 45.5

[56] References Cited

U.S. PATENT DOCUMENTS

| | | | |
|---|---|---|---|
| 2,728,702 | 12/1955 | Simon et al. | 156/242 |
| 3,061,475 | 10/1962 | Wallace | 156/78 |
| 3,647,609 | 3/1972 | Cyba | 428/320 |
| 3,755,031 | 8/1973 | Hoffman et al. | 156/78 |
| 3,844,878 | 10/1974 | Price | 156/309 |
| 3,874,980 | 4/1975 | Richards et al. | 428/337 |
| 3,903,346 | 9/1975 | Deleon et al. | 156/79 |
| 3,951,717 | 4/1976 | Herwes et al. | 156/79 |
| 3,953,269 | 4/1976 | Queen et al. | 156/79 |
| 3,980,511 | 9/1976 | Proucelle | 156/79 |

Primary Examiner—Douglas J. Drummond
Attorney, Agent, or Firm—Bert J. Lewen

[57] ABSTRACT

This invention pertains to a thermal insulating laminate which comprises a rigid, closed cell foam core, suitably a polyurethane foam core, and a porous fabric or paper sheet adhered to at least one surface of the core. The porous sheet layer is impregnated with polymeric material having the same composition as the core during the lamination process. This invention also pertains to the modification in which a metallic foil is bonded to the porous sheet by means of a flame-resistant and low smoke-producing adhesive. Preferably, there is also a network of glass fiber strands between the sheet and the foil. The laminate can be used as insulating board under built-up roofs, for wall sheathing in building construction, and all other normal applications for rigid polyurethane insulation. The laminate incorporating the foil-glass layers can also be utilized in situations where additional dimensional stability and additional flame resistance are required.

10 Claims, 4 Drawing Figures

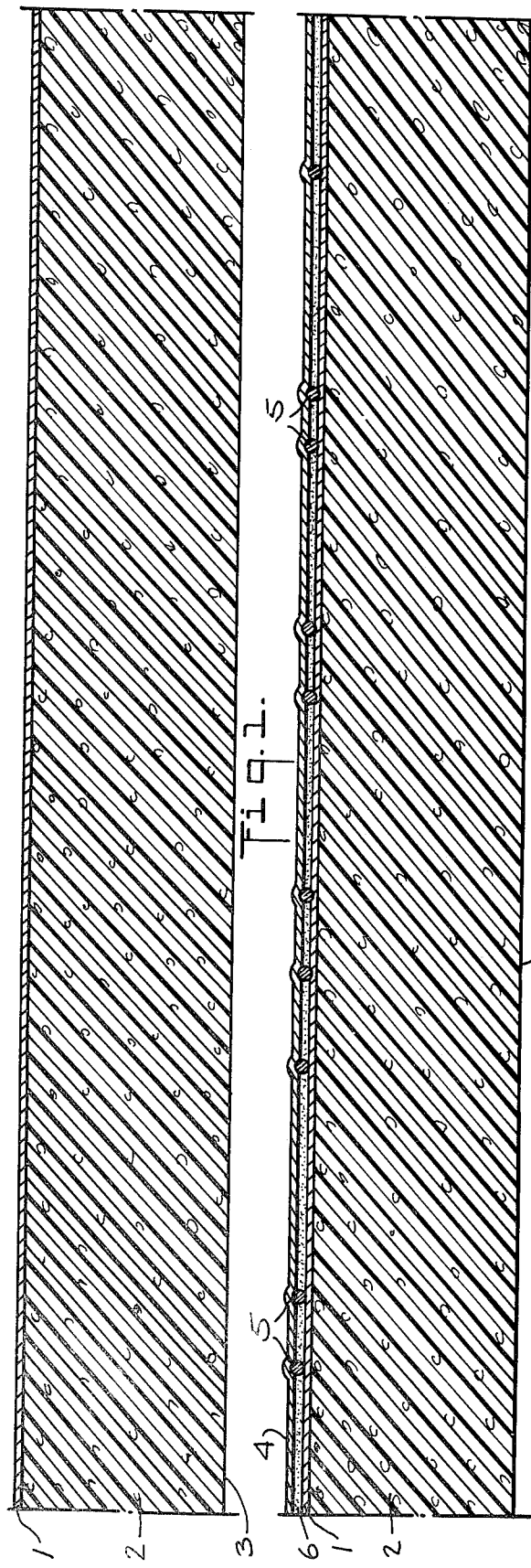
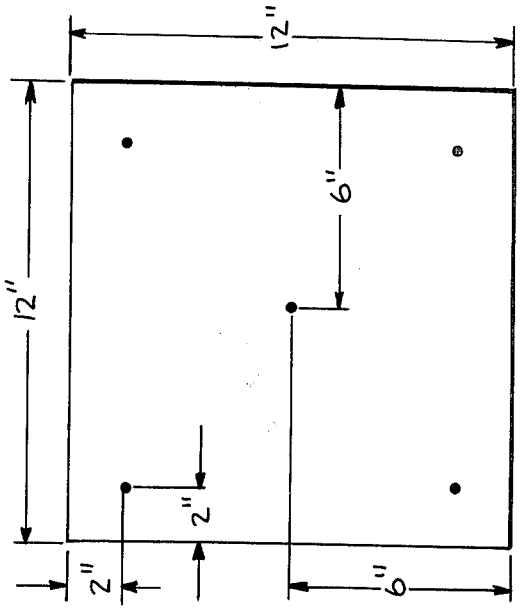
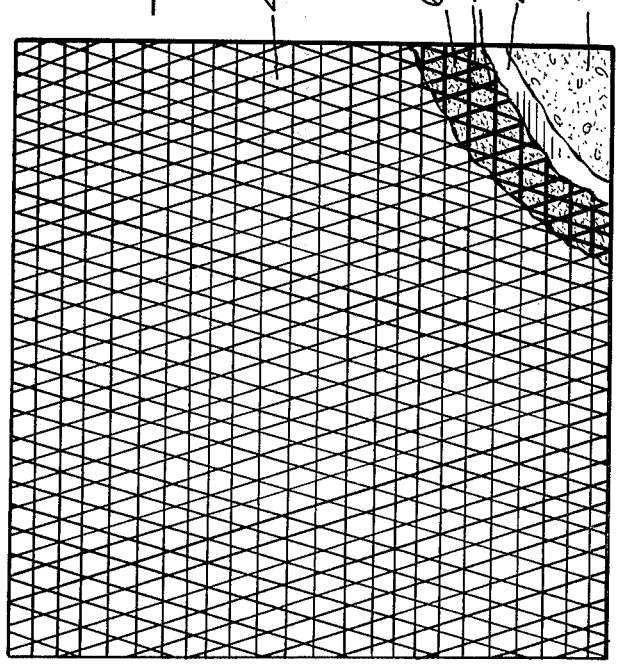

INSULATION BOARD

This is a continuation, filed Mar. 3, 1975 now abandoned which, in turn, is a continuation-in-part of application Ser. No. 518,111, filed Oct. 25, 1974 now abandoned.

This invention is directed to a thermal insulating laminate which comprises a rigid, closed cell foam core, suitably a polyurethane foam core, and a porous fabric or paper sheet adhered to at least one surface of the core. It is also directed to such a laminate in which a metallic foil is bonded to the porous sheet by a flame-resistant and low smoke-producing adhesive. Further, a network of glass fiber strands may be included between the sheet and the foil.

One of the prior art products consists in a composite in which a polyethylene film is interposed between paper and foam. The resulting sheet is more costly and in shorter supply (because of the petroleum shortage) than the products of this invention. The polyethylene causes smoke production in the event of a fire, hastens and enhances flame spread, and also precludes impregnation of the paper by the foam constituents. Laminates available in the past have contained more than one layer of paper or of a plastic such as polyethylene, and, because of their characteristics, such laminates have proved to be unreliable in passing the required humid aging test (ASTM D-2126), the hot mop test and the application of hot asphalt as practised in the construction of Built-Up Roofs (BUR). Details of these tests are provided below.

Because of the characteristics of the laminated board of this invention, it passes the humid aging test, the hot mop test, and the hot asphalt application as practised in the construction of BUR. The laminate incorporating the foil-glass layers also passes the tests for flame resistance and smoke evolution, such as ASTM E-84. It is considered that the penetrability of the porous sheet by the liquid polyurethane or other chemicals used in this invention during the laminate production is the key to the favorable properties possessed by the laminated board of this invention.

It is an object of this invention to provide a thermal insulating laminate.

It is also an object to provide a thermal insulating laminate with exceptional dimensional stability.

Further objects will be evident from the following description of this invention.

The foregoing objects are attained in this invention by adhering a porous paper or fabric sheet to at least one surface of a rigid, closed cell foam core, suitably a polyurethane foam core. During the laminating operation, the porous sheet is adjoined to the core and is impregnated with polyurethane or other core components. An alternative form of the invention involves bonding a metallic foil to the porous sheet by means of a flame-resistant and low smoke-producing adhesive. Further, a network of glass fiber strands may be interposed between the sheet and the foil.

FIG. 1 is a sectional view of the laminated board of this invention.

FIG. 2 is a sectional view of the laminated board of this invention in which a metallic foil and a glass fiber network are also incorporated.

FIG. 3 is a plan view showing a typical appearance of the glass fiber network.

FIG. 4 indicates how samples are to be marked prior to the Humid Aging test described below.

There are three types of continuous methods which are suitable for making the insulating board of this invention. In the Viking laminator process, the polyurethane chemicals or other core components are sprayed onto the sheet which will form the core facing. In the restrained rise process, the polyurethane chemicals or other core components are poured onto the sheet which will form the core facing. And, in the metering roll process, the sheet is coated from a bank of liquids in a metered continuous operation, commonly called the free rise process.

As regards the ingredients for the polyurethane foam core, suitable isocyanates include polymethylene polyphenylisocyanate, diphenylmethane diisocyanate and triphenylmethane triisocyanate. Suitable hydrogen donors for use in rigid foams are polyols of high functionality, some of which may be classified as polyethers, while others are sucrose derivatives, sorbitol derivatives and glycerol derivatives. Chlorinated and/or phosphorus-containing polyols are suitably used where flame resistance is desirable, as in the case of the laminating boards of this invention. Such polyols include hydroxy-terminated polyesters based on chlorendic acid and similar polyesters of tetrachlorophthalic acid. Hydroxylic pentaerythritol phosphites containing 15–20% of phosphorus can be polymerized by heating them until the viscosity at 25° C. has reached at least 20,000 centipoises, the product being polymeric organophosphite polyols which are suitable for interaction with polyisocyanates. Small quantities of castor oil are suitably used in the formulation when a rigid foam having good impact strength and good electrical properties is required. In general, it is desirable that the polyol have an average of at least three terminal hydroxy groups and have a hydroxyl number within the range of about 250 to about 750. Such polyols include polyethers prepared by the propoxylation of a triol such as glycerine; of a tetrol such as pentaerythritol; of a pentol such as arabitol; or of a hexol such as sorbitol. Other suitable polyols include hydroxy-terminated polyesters having a molecular weight within the range of about 400 to about 4,000, such as polyfunctional glycerine or trimethylolpropane-diethylene glycol or propylene glycol condensation products esterified with acids such as adipic, succinic and sebacic acid.

Instead of a core based on polyurethane, one produced with isocyanurate type polymers may be used. Such isocyanurate foams are well known to the art and are usually based on the trimerization of isocyanates in the presence of a catalyst. Suitable catalytic systems include metal oxides such as lithium oxide, tributyl tin oxide; alkoxides such as benzyl trimethyl ammonium methoxide, sodium methoxide, potassium tertbutoxide and borates; amines including triethylamine, dimethylbenzylamine, 2,4,6-tris(dimethylaminomethyl) phenol, 2,4- or 2,6-bis(dimethylaminomethyl) phenol, N,N,N'-tris(dimethylaminopropyl) symhexahydrotriazine; metal hydrides such as sodium borohydride; carboxylates such as sodium formate, sodium carbonate, potassium acetate, calcium acetate, mixtures of sodium benzoate and dimethylformamide, also alkali metal soaps, naphthenates, lead oleate salts and xanthates; hydroxides such as benzyl trimethylammonium hydroxide (usually in dimethyl sulfoxide); acids including hydrochloric acid, formic acid, aluminum trichloride, and Friedel-Crafts catalysts; organo-metallics, low molecular weight alkylenimides and aldehydes, as well as combination systems such as amines with epoxides, alcohols, carbonates, alkylene imides, carboxylic acids or peroxides, also ammonium hydroxides - carbamate systems.

Polyisocyanurate based polymers usually exhibit improved flame resistance over their all-polyurethane counterparts and withstand higher temperatures, and they may be prepared according to the well known one-shot method, i.e., the polyether glycol may be added to any additives such as (silicon) surfactant, blowing agent, etc. followed by the addition of a polyisocyanate and a trimerization catalyst while thoroughly agitating the mixture. Application of the reaction mixture to the membranes or skins may be accomplished as described below.

For additional information regarding isocyanurate trimerization catalysts and the preparation of polymer foams these publications are herewith incorporated by reference: U.S. Pat. Nos. 2,979,485, Mar. 26, 1957 and 2,993,870, Aug. 20, 1957 (Burkus), Belgian Pat. No. 609,265, Apr. 17, 1962 (Imperial Chemical Industries, I.C.I.), U.S. Pat. No. 3,635,848, Jan. 18, 1972 (Rambosek), British Pat. No. 1,155,768, June 18, 1969 (Ashida et al.), U.S. Pat. Nos. 3,250,732, May 10, 1966 (Bengelsdorf et al.), 3,578,622, May 11, 1971 (Cornell), 3,450,701, June 17, 1969 (Davies), 3,396,167, Aug. 6, 1968 (Davies), Belgian Pat. Nos. 723,151, Oct. 31, 1967 (Mobay Chemical Co.), 712,731, Apr. 30, 1968 (Mobay), 697,411, Apr. 22, 1966 (I.C.I.), British Pat. No. 1,080,487, Oct. 21, 1964 (I.C.I.) and Canadian Pat. No. 833,619, Apr. 8, 1968 (Hayash et al.).

The blowing agent may be any suitable blowing agent known to those skilled in the art. For example, normally liquid halogenated aliphatic hydrocarbons such as monochlorotrifluoromethane or dichlorodifluoromethane may be used. Such a blowing agent may comprise from about 5 to about 15 weight percent of the combined weight of polyol and polyisocyanate.

The foam stabilizer may be any of the stabilizers known to those skilled in the art, including dimethyl polysiloxane, polyethoxylated vegetable oils, polyethoxylated fatty acids, polyethoxylated phenols, and sorbitan monoesters. If the foam stabilizer is used, a desirable amount is from about 0.01 to about 5 weight percent, based on the total weight of charged materials.

Suitable catalysts include triethylene diamine, bis(2-dimethylaminoethyl)ether, dibutyltin dilaurate and stannous octate.

The polyisocyanate and polyols should be proportioned so as to provide for substantially equivalent amounts of the two ingredients, although it is preferable to employ a slight excess of polyisocyanate. The blowing agent is used in amounts sufficient to provide for a foam of the desired density. Preferably, the density of the foam core ranges from about 1.5 to about 3.0 lbs./cu.ft.

A membrane consisting of porous sheet material, a metalic foil, and a network of glass fiber strands therebetween, which is adhered to the polyurethane core, can desirably be prepared in accordance with the teachings of Muri et al. U.S. Pat. No. 3,202,567, which was issued on Aug. 24, 1965. The contents of this patent are hereby incorporated herein by reference. Special attention is directed to column 3, line 49 through column 5, line 15, and to column 5, line 64 through column 6, line 6.

The porous sheet can consist of any porous paper or fabric, such as rag paper or asbestos sheeting. An especially suitable material is 25–50 lb. porous laminating kraft paper, 30 lb. kraft paper being preferred. The porous layer must be sufficiently porous to admit enough of the liquid polyurethane chemicals so that, on the curing thereof, the resulting product is capable of passing the several tests referred to above.

When the laminated board includes a metallic foil outer layer, this layer provides fire resistance in addition to impenetrability to moisture. The minimum suitable thickness for this layer is about 0.00035 inch. Increasing thickness of this layer provides increased strength and fire resistance to the final product. Among suitable metallic foils for this purpose are aluminum and copper foils.

As has been indicated above, a fiberglass or equivalent network is desirably embedded in the adhesive layer between the porous and metallic layers to improve structural strength and dimensional stability. Dimensional stability is further improved as there is an increase in the glass fiber content at right angles to the laminating machine direction. While the use of such a network is preferred, it can be omitted if its contribution is not required, i.e., if the structural strength and dimensional stability of the final product can be sacrificed to some extent. Fiberglass equivalents include sisal or other reinforcing fibers and metal wires. The parallel strands in the network can be close enough to touch each other, but are preferably as much as ½ inch apart. More than one network layer of strands can be utilized. However, this is unnecessary for the purposes of this invention. It is also undesirable to have the network layer be so thick that the liquid polyurethane chemicals do not penetrate satisfactorily into the membrane and thereby the end product is caused to fail in the humid aging and the other specified tests.

As has been mentioned above, it is essential that the liquid polyurethane or other chemical formulation must be applied at the same time to both porous or other sheets. It is also important, in the laminating process, that heat not be applied too early. The "cream time", i.e., the first point at which the polyurethane formulation is no longer liquid, is increased by keeping the external heat down and by keeping the amount of catalyst in the formulation down. The use of a suitable cream time enables sufficient penetration of the porous sheet by sufficiently fluid polyurethane chemicals so that the end product is capable of passing the humid aging and hot mop tests. It is highly desirable that the polyurethane chemicals must have reacted and that the foam expansion be at least 90% complete before external heat is applied to the laminate. A suitable temperature for curing the laminate is approximately 150° F.

Instead of applying the porous sheet or membrane described above to both surfaces of the polyurethane core, the following materials may be applied to one surface of the core in order to achieve desired results, e.g., the production of laminates suitable for use in Factory Mutual Class 1 roof construction: perlite board; gypsum board; mineral fiber board; fiberglass board; metal panels; similar rigid construction materials. The normal range of thickness for these materials is on the order of up to 2 inches.

In producing the laminated board of this invention, the first step is to deliver to the laminating machine mixing head the combination of chemicals required to produce a finished product possessing the desired physical properties such as density, dimensional stability, compressive strength, insulation value, and all other properties generally considered to be desirable in urethane foam laminates. Standard practices used in formulating, proportioning, pumping, and mixing of the chemicals as practiced in the industry are acceptable as long as a consistently metered and completely mixed chemical blend is the result of the practice. The following typical formulation is quite well suited for producing the laminated boards of this invention:

|  | Parts by Weight |
|---|---|
| Polyol (sucrose-type having hydroxyl number of 495-505) | 90 |
| Tri(beta-chloroethyl)phosphate (non-reactive fire retardant) | 10 |
| Alkylsilanepolyoxyalkylene copolymer (surfactant) | 1.0 |
| Amine catalyst | 1.2 |
| Dibutyl tin dilaurate | 0.16 |
| Freon 11 (blowing agent) | 36-38 |
| Methylenebis(4-phenylisocyanate) (MDI) | 118 |

All of the ingredients, except the last two, are mixed in advance, and the Freon 11 and the MDI are added at the laminating machine mixing head.

One mandatory requirement of this process is that the total combined chemical mixture should have a sufficiently long cream time and low enough viscosity to allow it to substantially penetrate the porous sheet or the porous portion of the membrane or to sufficiently penetrate a semi-penetrable rigid construction material when used as one skin of the total laminate. A suitable cream time for this purpose is 7-10 seconds. In the same vein, the temperature of the combined and mixed chemicals at the point of application must be suitable to insure adequate time and proper viscosity for proper penetration of the porous sheets or skins. A desirable temperature for the chemicals at the point of application is about 23° C. As has been mentioned, it is required that the urethane or other polymerization reactants penetrate the porous sheet and cause it to become impenetrable to moisture and also to create the most intimate bond or adhesion of the sheet to the foam core.

Once the total chemicals have been mixed, they must be applied to both porous sheets simultaneously and uniformly. Most methods that insure even distribution of chemicals are acceptable and can include such methods as spray, liquid stream dispense or flow coat dispense as long as the juxtaposed surfaces of both porous sheets are contacted with the liquid at the same time. It is very important that the sheets are not pre-heated excessively prior to contact with the liquid urethane or other mixture or the penetration of the liquid will be inhibited due to an acceleration of the chemical reaction. Thus, the temperature of the sheets at the time of the application of the liquid urethane or other mixture should be in the range from 25° to 35° C.

A particularly desirable membrane is one in which the aluminum foil is 0.00035 inch in thickness, a flame resistant adhesive is used, the reinforcement is is provided by ¼ × ¼ fiberglass and the other surface of the membrane is 30 lb. kraft paper. A suitable flame resistant adhesive is that set forth in Example I of Muri et al. U.S. Pat. No. 3,202,567, which Example is hereby incorporated herein by reference.

Once the sheets have been penetrated with the liquid urethane and the reaction of the chemicals has started, the sheets should not be allowed to separate from the foam core and any external heat should be used with great care. It is desirable to achieve approximately 90% of full rise before any external heat is used. This will minimize any undesired reactions between any potentially reactive constituents in the sheets and any unreacted portion of the urethane foam. The objective here is to create conditions through natural reactivity and the use of catalysts so that the foam reaction occurs first and thereby reaction with any potentially reactive constituents in the sheets is reduced. One of the most common potentially reactive constituents in porous sheets is water, which could easily be liberated into the as yet unreacted urethane chemicals by too early an application of heat or excessive heat. A good practice is to have complete temperature control of the entire process are so that it is neither too hot nor too cold, especially in the zone between where the sheets are first contacted with the liquid urethane chemicals and the foam is fully risen and the internal temperature of the foam has reached 150° F. The temperature of such entire process area should desirably be maintained in the range from 20° to 24° C. As the laminate is progressing from the point of liquid application to the end of the process, increasingly higher temperatures can be used to insure complete curing of the laminate. The higher temperatures for curing should be in the range from 120° to 150° F. The application of the external heat normally occurs 45 to 60 seconds after the application of the chemicals to the sheets and such heat application normally continues for 1-1.5 minutes.

Once the laminate has been completely formed and sufficiently cured, it can be cut to size using any suitable method such as rotary saws or band saws. Any grooves or vents (made by grooving or profiling) that must be made in either side of the board, in order to enable the escape of moisture from the board when used for sheathing, are desirably made in a continuous manner as the cured laminate optionally passes through the perforator rolls prior to being cut to finished sizes. A good practice is to stack the cut-to-size pieces of laminate and allow the curing process further opportunity to be completed before shipping the laminate to the final use point. The cure is normally completed in about 24 hours at ambient temperatures. Quality control is a continuous part of production and samples are taken at regular intervals for purposes of such tests as density, adhesion of sheet layer to core, humid aging, hot mop, cold box, compressive strength and proper finished size.

In FIG. 1, the porous paper or fabric layer 1 is in direct contact with polyurethane core 2. At surface 3 of core 2, the component 1 can be duplicated, or, as stated, surface 3 may be in contact with one of the specified rigid construction materials. It is desirable that the latter materials, other than metal panels, also be sufficiently porous so as to absorb some of the liquid polyurethane chemicals.

In FIG. 2, layer 1, core 2 and surface 3 are as in FIG. 1. Layer 4 is the metallic foil layer. The fiberglass or equivalent network 5 is adjacent to layer 4 and embedded in adhesive layer 6. Also in contact with network 5 and adhesive 6 is the porous paper or fabric layer 1. The latter layer is in direct contact with polyurethane core 2. At surface 3 of core 2, the components 1 and 4 through 6 can be duplicated, or, as stated, surface 3 may be in contact with one of the specified rigid construction materials. It is desirable that the latter materials, other than metal panels, also be sufficiently porous so as to absorb some of the liquid polyurethane chemicals.

FIG. 3 is a plan view of the product of FIG. 2. Normally, the foil layer 4 is sufficiently thin so that the details of the network layer 5 can be determined by an inspection of the surface of layer 4.

When the laminated board of this invention is used as roofing insulation, it is desirably perforated on the upper side (as installed) or on both sides (in cases where fluorocarbon gas release may occur from both sides of the laminated board). The perforations can, for example, have ⅜ inch centers and 1/6 inch diameters. The perforations need extend only slightly into the polyurethane core layer. The purpose of the perforations is to permit gas release from the foam during high temperature exposure of the laminated board to prevent separation of sheet material from the core or the rupture of the sheet material. Such exposure includes hot asphalt mopping at 400°–450° F. as is practiced in standard BUR procedures.

Typical desirable properties of the laminated boards of this invention are as follows:

| Property | Test Method | Value Kraft | Value Foil/Glass |
|---|---|---|---|
| "k" Factor- core only (BTU·in./hr.· sq.ft.· F.) | ASTM C177 | 0.13 to 0.15 | 0.13 to 0.15 |
| Compressive Strength 10% Deformation, psi | ASTM D1621 | 35–40 | 40 |
| Water Vapor Transmission permeability —inches | ASTM C355 | 1 to 3 | 0.1 to 0.3 |
| Service Temperature, ° F. | — | −200 +250 | −200 +250 |
| Dimensional Stability 24 hr. % linear change | 158 ± 5° F. 100 − 5% R.H. | less than 5.0 | less than 1.0 |

The humid aging and hot mop tests for the laminated board of this invention are described below:

HUMID AGING

Apparatus:

1. Standard Environmental Cabinet Model CRH/9FS 9 ft.³ Chamber, Standard Env. Cabinet Corp.; Totowa, N.J.
2. Service: 220 V, 1 phase and 110 V, 1 phase electrical.
3. Vernier Caliper: 12 inches preferably.
4. Thickness Gauge: Type optional.

Preparation:

1. Samples:
   A. Size: 12 inch × 12 inch × manufactured thickness.
   B. Conditioning of Sample: Sample to be tested shall be aged for at least 24 hours at ambient conditions, prior to being cut to test size. A minimum of 2 samples from each lot shall be prepared.
2. Humidity Cabinet Conditioning: The cabinet shall be conditioned, and be stabilized for a minimum of 6 hours prior to sample insertion. Conditions shall be:
   A. Humidity: 98 ± 2%.
   B. Temperature: 158 - 5° F.

Test Method:

1. Sample Measurement: After cutting samples to be tested to the nominal 12 inch × 12 inch size, carefully measure, using the vernier caliper as follows:
   A. Mark sample with a suitable pen as per FIG. 4, and measure.
   B. Measure thickness, at the 5 places indicated in FIG. 4.
   C. Record length, width and thickness within 1/10 inch.
   D. Weigh sample within 0.1 gram and record.
2. Test Procedure:
   A. Place samples in test chamber, on an open grid.
   B. Samples shall remain in chamber at the condition required for exactly 24 hours.
   C. After 24 hours, samples shall be removed and conditioned at ambient temperature and humidity for a minimum of 2 hours.
   D. Measurements shall be taken as specified in "Sample Measurements" above.
   E. Weigh sample within 0.1 gram and record. Results:
1. Visual inspection is performed to note changes, if any, i.e., peeling of porous sheet or the like.
2. Measurement Changes:
   A. Percent change in width, one direction.
   B. Percent change in width, other direction.
   C. Percent change in thickness.
   D. Percent change in weight.
3. Total % volume change is calculated from above Measurement Changes; maximum allowable change shall be less than 5%.

HOT MOP TEST

This method of test simulates actual conditions for the roof application of hot-mopped asphalt. Apparatus:

1. A heater and container to heat a minimum of 5 gallons of asphalt. Electric or gas fired, suitably ventilated.
2. Asphalt shall be "dead-level" standard roofing asphalt.
3. Asphalt roofing mop: Use standard roofing mop.
4. Thermometer: 0°–700° F. range.

PREPARATION:

1. Test Assembly:
   A. Size: Minimum work surface area required, 5 foot × 7 foot to allow a minimum of two 3 foot × 4 foot laminated boards to be tested simultaneously.
   B. Deck: Surface to be large insulation boards, which are discarded after each use. Other surfaces, such as wood, concrete or metal decks are suitable.
2. Samples:
   A. Standard production materials, full size, conditioned at ambient conditions for a minimum of 24 hours.
   B. Thickness: optional, as produced.
   C. Number of samples required: 2 per test.

TEST METHOD:

1. Asphalt: Heat asphalt to 450° ± 25° F.
2. Assembly Preparation:
   A. Fasten base insulation or other suitable base securely to floor of test area.
   B. Place roofing mop in hot asphalt.

3. Test Procedure:
   A. Apply heated asphalt to base insulation, and adhere test samples, pressing same to base. Allow assembly to cool for 5 minutes.
   B. Hot mop asphalt over test samples, using standard flood coat, i.e., minimum of 20 lbs. asphalt/sq.ft. and allow assembly to cool.

RESULTS:
1. Visual Inspection: Check for:
   A. Edge curl.
   B. Foam shrinkage.
   C. Sheet delamination.
2. Measurements:
   A. Record any change in physical dimensions.
   B. Record curl, if any, within 1/16 inch.
3. Cause for Rejection of Lot:
   A. Rejection of lot shall occur if curl, sheet delaminations, or foam shrinkage is observed. Curl shall be in excess of ¼ inch as cause for rejection.
   B. Any sheet delaminations shall be cause for rejection. This shall include "blowing" of sheet or any portion thereof from core.

The laminated board of this invention having two skins of porous sheet can be used wherever rigid insulation is required, e.g., for rigid insulation of roofs, walls and floors (whether the buildings are prefab or site erected) and for the insulation of mechanical equipment, duct work, storage containers and vehicles, including mobile homes and heated or refrigerated vehicles. Typical end uses include:
   roof insulation board for use in standard BUR and shingle nail;
   roof insulation board for nail down installation;
   plaster board and plaster base; cavity wall; perimeter; sandwich panels; precast panels; curtain wall panels; cold storage construction;
   sheathing board for use in place of standard construction of frame structure dwellings where it would replace both the conventional insulation and the normal sheathing board used under the exterior siding.

When one skin is a porous sheet or a skin of kraft/glass/foil and the other skin is acceptable as Factory Mutual Class #1 for roofs:
   roof insulation board for use in standard BUR where Factory Mutual approval as a Class #1 material is required.

When one skin is a porous sheet and the other skin is a semi-penetrable skin (or a metal sheet skin in some instances):
   any application where a foam insulation material is required either as an insulation or as a stiffening component of a laminate.

When two skins of kraft/foil are used:
   any application where insulation is required that does not need the superior dimensional stability contributed by the glass fiber. Any laminate constructed in this way will still have normal dimensional stability and will possess all the other desirable properties such as superior adhesion of membrane to the cord and moisture resistance.

When two skins of kraft/glass/foil are used:
   industrial or agricultural insulation panels where superior strength, durability, dimensional stability and improved fire resistance are required;
   same uses listed above, but where additional dimensional stability and flame resistance are required;
   also, one surface can be notched and the board folded to fit corners, around pipes, and the like; a continuous surface is presented on one side with uninterrupted glass fiber reinforcement.

When one skin of kraft/glass/foil and the other skin is a semi-penetrable skin (or a metal sheet skin in some instances):
   any application where a foam insulation material is required either as an insulation or as a stiffening component of a laminate. Note: the exceptional dimensional stability of this laminate and the superior strength of the glass fiber contribute to minimum warpage of panels made with such dissimilar materials as the kraft/glass/foil membrane and plaster board, masonite, high density mineral fiber board, perlite board, etc.

What is claimed is:

1. A process for making a thermal insulating laminate capable of passing the Humid Aging Test, which laminate has (i) a rigid closed-cell foam core, the cells of said core containing a fluorocarbon gas, and (ii) a porous sheet of paper adhered to a first face of said core, comprising the steps in order:
   (a) applying liquid polyurethane or polyisocyanurate-based polymer chemicals at a temperature of about 23° C. to the porous sheet at a temperature of from 25° to 35° C. in a process area at a temperature of from 20° to 24° C., said liquid chemicals having sufficiently long cream time and low enough viscosity to impregnate said porous sheet prior to foaming;
   (b) allowing the liquid chemicals to foam to produce the rigid core, said core being allowed to rise to at least approximately 90% of full rise before applying any external heat to it; and
   (c) curing the laminate at a temperature in the range of from 120° to 150° F.

2. The process of claim 1 wherein the cream time is 7 to 10 seconds.

3. The process of claim 1 in which the porous sheet is 25 to 50 pound porous laminating kraft paper and the fluorocarbon gas is Freon 11.

4. The process of claim 1 wherein a second porous sheet of paper is adhered to a second face of the core opposite the first face and the liquid chemicals are applied to and between the porous sheets simultaneously.

5. The process of claim 1 wherein a metallic foil coextensive with the porous sheet is bonded thereto by a flame-resistant and low-smoke producing adhesive, said foil constituting the outer layer of the insulating laminate.

6. The process of claim 1 further comprising perforating the porous sheet.

7. The process of claim 1 further comprising perforating the porous sheet and metallic foil.

8. The process of claim 1 wherein a network of glass fiber strands is embedded in the adhesive.

9. The process of claim 1 further comprising grooving an outer surface of the laminate to provide moisture transmission channels.

10. The process of claim 5 further comprising grooving an outer surface of the laminate to provide moisture transmission channels.

* * * * *

UNITED STATES PATENT AND TRADEMARK OFFICE
CERTIFICATE OF CORRECTION

PATENT NO. : 4,121,958
DATED : October 24, 1978
INVENTOR(S) : Lamonte R. Koonts

It is certified that error appears in the above-identified patent and that said Letters Patent are hereby corrected as shown below:

Claim 7, line 1, change "claim 1" to --claim 5--

Claim 8, line 1, change "claim 1" to --claim 5--

Signed and Sealed this

Fourth Day of December 1979

[SEAL]

Attest:

Attesting Officer

SIDNEY A. DIAMOND

Commissioner of Patents and Trademarks